United States Patent [19]

Kume

[11] 4,034,737
[45] July 12, 1977

[54] SOLAR HEAT BOILER
[75] Inventor: Takeshi Kume, Amagasaki, Japan
[73] Assignee: Suehiro Seiki Company, Ltd., Japan
[21] Appl. No.: 589,777
[22] Filed: June 23, 1975
[30] Foreign Application Priority Data
June 21, 1974 Japan ............................. 49-71574
June 21, 1974 Japan ............................. 49-71575
[51] Int. Cl.² ............................................. I24J 3/02
[52] U.S. Cl. ................................. 126/271; 350/299
[58] Field of Search ............. 126/270, 271; 60/641; 350/293, 294, 299, 310

[56] References Cited
U.S. PATENT DOCUMENTS

| 1,806,216 | 5/1931 | Plummer | 122/39 |
| 2,460,482 | 2/1949 | Abbot | 126/270 |
| 2,760,920 | 8/1956 | Olsen | 126/270 |
| 2,987,961 | 6/1961 | Cotton et al. | 126/270 |

FOREIGN PATENT DOCUMENTS

| 490,446 | 2/1954 | Italy | 126/270 |

Primary Examiner—Kenneth W. Sprague
Assistant Examiner—James C. Yeung

Attorney, Agent, or Firm—Wenderoth, Lind & Ponack

[57] ABSTRACT

A solar heat boiler apparatus has a base frame, a turning body rotatably mounted on the base frame for turning movement about a horizontal axis, a reflector mounting frame rotatably mounted on the turning body for rotation around an axis perpendicular to the horizontal axis, and turning mechanisms coupled to the turning body and the reflector mounting frame for turning the turning body and the reflector mounting frame to direct the reflector mounting frame toward the sun. A plurality of curved mirrors are mounted side by side on the reflector frame in a concave spherical arrangement to form a reflector unit, each curved mirror having, in plan view, the shape of a sector of an annulus and in longitudinal section the shape of a part of a circle. The mirrors in the arrangement are positioned with the sector shapes on circular lines concentric with the optical axis of the concave spherical arrangement and to reflect rays incident on the reflector unit parallel to the optical axis of the concave spherical arrangement to a focal position on the optical axis. A boiler unit is positioned at the focal position to receive the reflected rays.

5 Claims, 13 Drawing Figures

SOLAR HEAT BOILER

This invention relates to a reflector for use in a solar heat boiler and a solar heat boiler unit which utilizes solar heat energy.

BACKGROUND OF THE INVENTION

The total amount of solar energy striking the entire surface of the earth is enormous. However, the energy per unit of area is fairly small and calculated by the following equation, due consideration being given to the revolution of the earth and spherical shape of the earth's surface: solar constant of 2 Cal/cm$^2$.min × ¼ (efficiency of incidence) × ⅔ (the remaining ⅓ is reflected from the surface) × ⅔ (the remaining ⅓ is absorbed in the atmosphere). The amount of energy thus calculated comes to approximately 133.3 Kcal/m$^2$.h.

Consequently, in order to utilize the heat energy radiated from the sun as a heat source, it is necessary to concentrate solar light rays to increase the energy density thereof.

However, in calculating the incident solar energy of a solar boiler, it is not required to take into account the above-mentioned efficiency of incidence (¼) and the efficiency drop caused by reflection from the surface of the earth (⅔), provided that the average energy per unit of area radiated on the entire surface of the earth is always received at a right angle to the reflector surface. Thus, the incident energy received per unit area of the reflector amounts to 799 Kcal/m$^2$.h (2 Cal/cm$^2$.min × ⅔). A concave mirror is efficient as a condensing means. However, a large concave mirror is difficult to manufacture and is costly.

In order to overcome this difficulty, a method can be considered in which small flat mirrors are placed on a large concave surface to concentrate solar rays received by the mirrors. However, this method is not efficient as an energy concentrating means.

A method can also be considered which utilizes concave spherical mirrors or curved mirrors in place of the small flat mirrors in order to concentrate solar rays on a focal point to increase the energy density. This method is also deficient because generally a concave mirror, regardless of whether it is spherical or parabolic, has a tendency to scatter incident rays projected at an angle to the optical axis.

To gain a better understanding of the scattered focal length, reference is made to FIG. 1 in which an incident ray projected at an angle to the optical axis connecting the center of curvature A and focal point B of a curved mirror reflects from the surface of the curved mirror and does not focus at a point on the optical axis, but is scattered to points outside of the length thereof.

Accordingly, even if a heating surface screen of a solar boiler is positioned at the focal point of such a mirror, the solar rays which are not parallel to the optical axis reach the surface of the boiler before or after they are focused, thus making it difficult to concentrate the solar energy.

As can be understood from the unit Cal/cm. sec. C° of heat conductivity in a heated metal body, the larger the temperature difference between the two opposite surfaces, the more efficient the heat transfer. Therefore, the more concentrated the solar energy and the higher the temperature of the solar rays received at the heating surface, the better the solar boiler efficiency, and the scattered rays impair the function of the solar boiler.

OBJECT AND BRIEF SUMMARY

The objects of this invention are to remedy the above-mentioned deficiency and further to provide an economical solar boiler.

These objects are achieved by a solar furnace according to the invention which consists of a bottom part having a turning body supported on a base frame for rotation around a horizontal axis, a reflector mounting frame supported on an upper part of said turning body rotatable about an axis perpendicular to the said horizontal axis, and turning mechanisms provided for the turning body and reflector mounting frame, respectively. A large number of curved mirrors are arranged on the reflector mounting frame in a concave spherical configuration as a reflector body. A boiler body comprising a water jet screen boiler is provided which has the heat-receiving section located at the focal point of the reflector body. The optical axis of the reflector body is directed toward and made to follow the sun, thus making use of the heat energy radiated from the sun for heating boiler water.

BRIEF DESCRIPTION OF THE DRAWINGS

The invention will now be described in detail in connection with the accompanying drawings, in which.

DETAILED DESCRIPTION OF THE INVENTION

Figure 1:
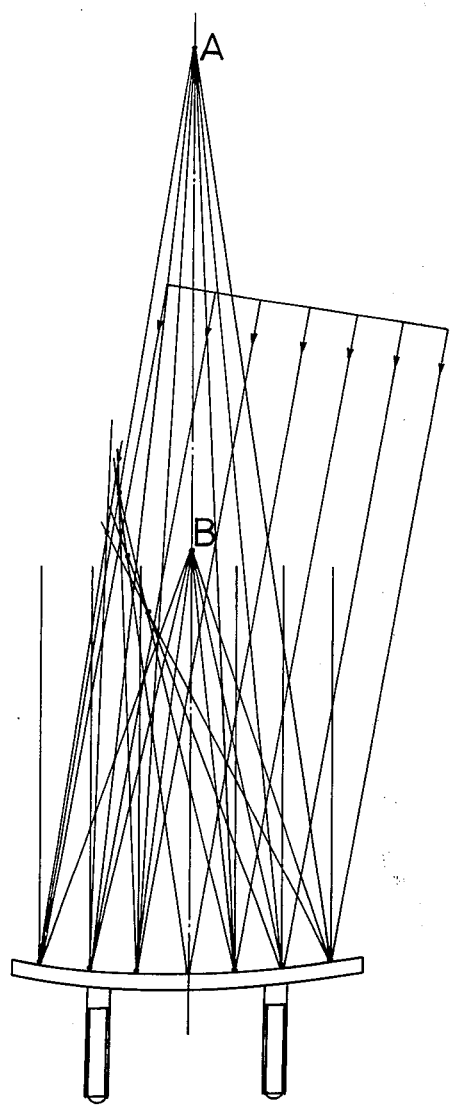
FIG. 1 is a side view of a curved mirror showing schematically focussed solar rays projected thereon at an angle to the optical axis of the curved mirror.
Figure 2:
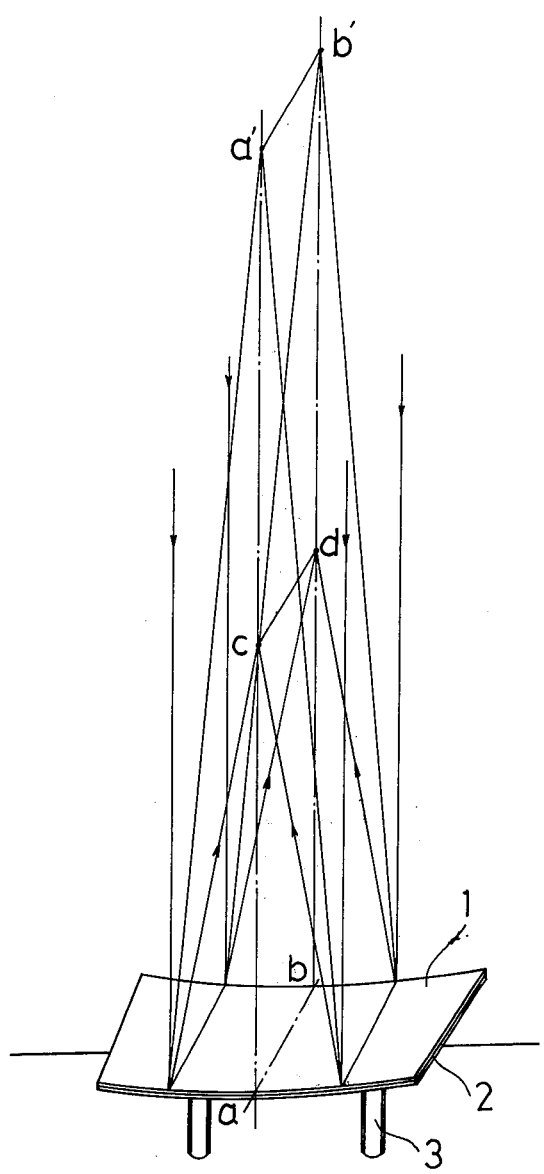
FIG. 2 is a perspective view of a curved mirror showing an outline of the focused image of solar rays projected thereon parallel to the optical axis of the curved mirror.

With reference now to the drawing and more particularly to FIG. 2 thereof, a curved mirror 1 is provided as an element for a reflector, the mirror having the shape of a sector of an annulus in plan view and a concave circular section in longitudinal section. The said curved mirror is mounted on a mirror supporting rack 2 having supporting legs 3.

Figure 4:
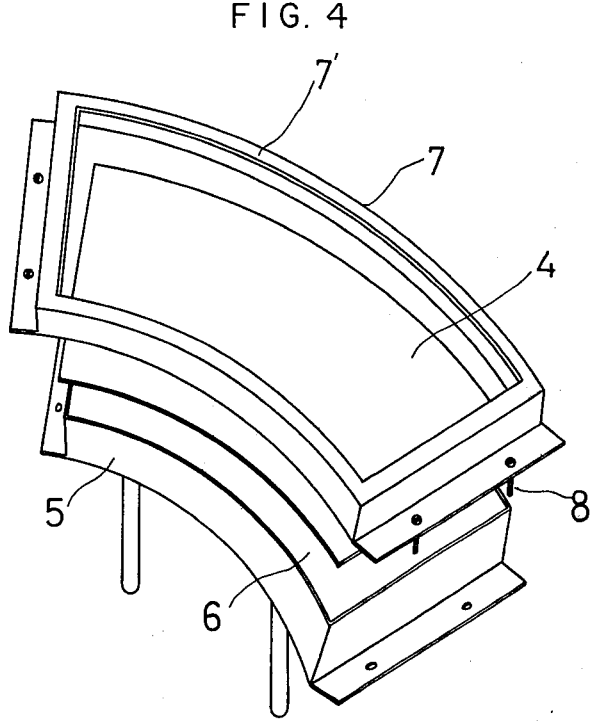
FIG. 4 is a perspective view of the parts of a mirror supporting rack for shaping a mirror plate into a curved mirror.
Figure 11:
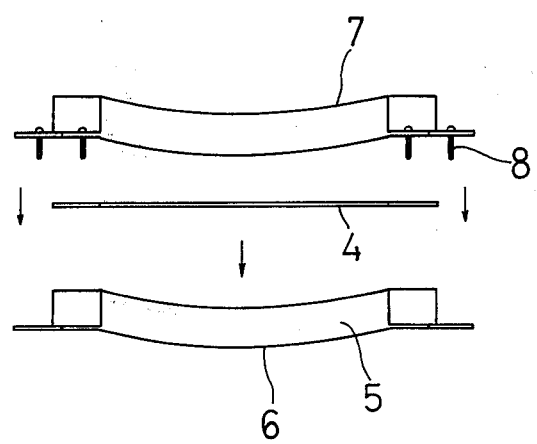
FIG. 11 is a front exploded view of the rack of FIG. 4.

In order to facilitate holding of said curved mirror, the arrangement as shown in FIGS. 4 and 11 is used. A mirror supporting assembly or rack comprises upper member 7 having an inwardly extending flange 7' at the top and a lower member 6 having an upright flange 5 thereon. The lower member 6 is filled within upper member 7, flange 7' corresponding with the top edge of flange 5 and being vertically arched very gently or slightly in the shape of a circle, as shown in FIG. 11, while the assembly itself in the plan view has the shape of a sector of an annulus as shown in FIG. 4. A flexible mirror plate 4 corresponding in the plan view to mirror 1 and having a vapor deposited coating on its top surface, and having a shape generally corresponding to the interior of upper frame 7, is placed on the top edge of flange 5 and then covered with upper member 7 under pressure, so that flange 7' presses the mirror plate 4 against the flange 5 to form a curved mirror, and thereafter the upper and lower members 6 and 7 are fastened together by nuts or screws 8. For this purpose, a mirror plate 4 a little longer than the inside length dimension of the upper member 7 is necessary.

Since the mirror plate is flexible and can be formed separately from the supporting rack, the tin vapor coating can be placed on the plate surface by a mass-production operation by vacuum vapor coating. Such tin coating preferably uses bronze containing 40% of tin, instead of tin alone.

A parabolic curve is most preferable for the curvature of the curved reflector because of its image focussing effect.

However, it is quite difficult to form a mirror in the shape of a parabolic curve.

For example, when forming the mirror by pressing, it is necessary to compensate for dimensional deviations between the curves of the original mold and those of the pressed mirror caused by spring back. According to the present invention, a simple circular section can be used.

Figure 5:
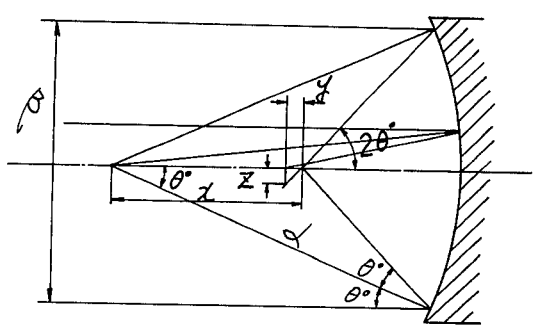
FIGS. 5 and 6 are diagrams showing the focus deviation of solar rays directed onto a curved mirror.
Figure 6:
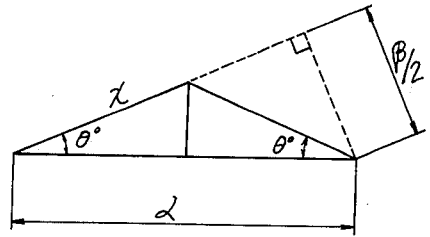

In order to calculate the aberration of the curvature at the end of the curved surface, let the radius of the curvature be $\alpha = 2.3m$ and the width $\beta = 0.3m$, as illustrated in FIGS. 5 and 6. An angle $\theta$ between the optical axis and a line connecting the outside end and the center of the curvature is calculated as $\theta = 3°43'$ from equation $$\sin \theta = \frac{\beta/2}{\alpha} = \frac{0.15}{2.3} = 0.0652$$

as seen from FIG. 5. Since $\theta$ is considerably small, X can be calculated by solving $$\cos \theta \approx \frac{\alpha/2}{x} = \frac{\alpha}{2x}$$

from the equation in FIG. 6. Then $$X \approx \frac{\alpha}{2 \cos \theta} = 1.152m.$$

An incident solar ray along the optical axis of the curved reflector reflects at an angle $\theta$ of 0°, so that $X = \alpha/2$ holds true for this case.

Likewise, incident solar rays near the optical axis, which are less affected by the aberration of the curved surface, focus their images at $X = 1.150m$, i.e. half the length of the radius of curvature. On the other hand, incident solar rays reflected near the outside ends of the curved surface focus their images at $X = 1.152m$ due to the aberration of the curved surface.

The deviation $y$ amounts to 2mm along the optical axis, and the width or amplitude $z$ of the non-focussed image is $$Z = y \tan 2\theta = 2 \tan 7°26' \approx 0.26mm.$$

As compared to the focussing ability of a telescope, in which the resolving power of an image is important, a solar boiler reflector designed chiefly for concentrating the solar energy is unaffected by such a small deviation.

Consequently, the curvature of the mirror surface need not necessarily be parabolic, and only a sector of a simple circle is sufficient.

Since the curved mirror described in this invention is a part of the cylindrical surface as shown in FIG. 2, the centers of curvature lie along a line $\overline{a'b'}$, and the focal points also lie along a line $\overline{c\,d}$. The optical axes define an optical axial plane $\overline{abdc}$, each of the lengths $\overline{a'b'}$ and $\overline{c\,d}$ equaling the width $\overline{a\,b}$ of the curved mirror.

Figure 3:
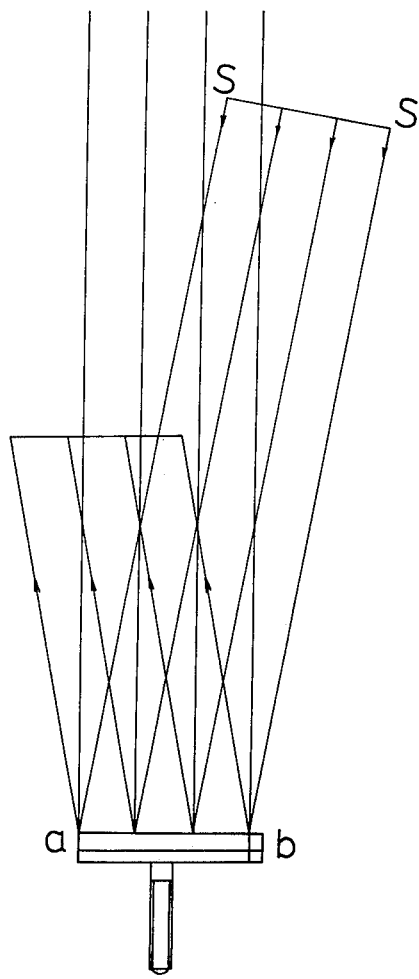
FIG. 3 is a section on line III—III of FIG. 2.

Accordingly, a shown in FIG. 3, incident solar rays $\overline{S}$ $\overline{S}$ parallel to the optical axial plane $\overline{abcd}$ will focus on a line $\overline{ef}$ on an extension of line $\overline{cd}$, even if the rays are projected at some angle to line $\overline{ab}$.

Figure 7:
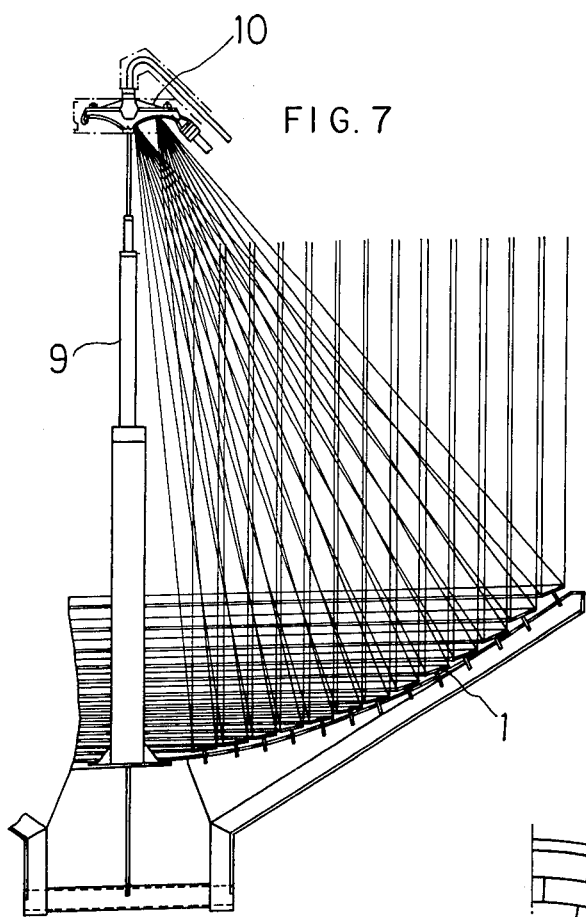
FIG. 7 is a partial sectional side view of a solar boiler showing concentrated rays.
Figure 8:
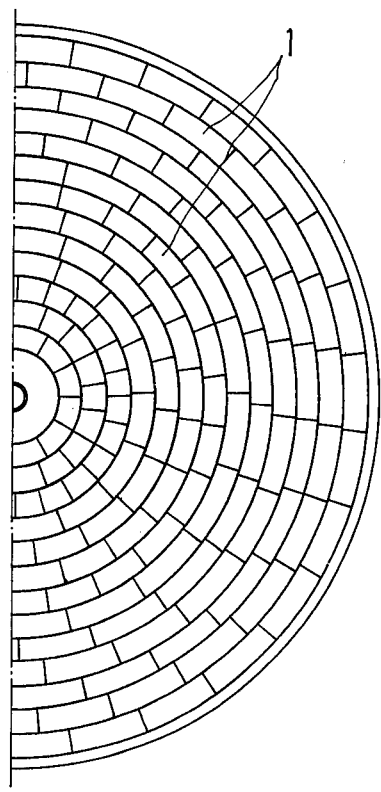
FIG. 8 is a partial plan view showing an arrangement of curved mirrors.

Making a practical application of this principle, as shown in FIGS. 7 and 8, small curved mirrors 1 assembled in a supporting assembly or rack, as shown in FIGS. 4 and 11, are so arranged that the sector shapes lie on circular lines concentric with the optical axis of the concave spherical surface of the reflector unit, and their optical axial planes are directed or oriented to the optical axis or generally to a supporting post 9 of a large concave spherical surface, and at the same time the small curved mirrors are so arranged at some angles on the spherical surface in respective places that the incident solar rays SS parallel to the optical axis of the large concave spherical surface are focussed and overlapped or concentrated on the same conical surface after reflecting from the small curved mirrors 1. Thus, radial focal images are obtainable on a relatively narrow area, such as a boiler heating surface 10, to increase the energy density.

The efficiency of this concentrating device will be slightly inferior to that of a small convex lens having a focal point concentration. However, an extremely large energy density is obtainable from the above-described concentrating means as compared with other concentrating means using a large spherical surface. Even with actual dimensions of 0.1 m for the width of the small curved mirror surfaces, and 5m outer diameter of the concave spherical surface, a load of approximately 20,000 Kcal/$m^2$.h is obtainable at the heating surface provided at the focal part thereof.

Since the energy thus obtained is utilized as the heat source of the boiler, the concentrating means in accordance with this invention provides a solar boiler which has an extremely simple construction, which has reduced manufacturing cost, and which is further very durable for its service life.

In order to utilize the solar heat which can be obtained by concentrating solar rays by the above-described sort of reflector means most efficiently, it is necessary to carry out efficient heat exchange and further to change the position of the optical axis of the reflector body so that it is directed toward and follows the sun.

Figure 9:
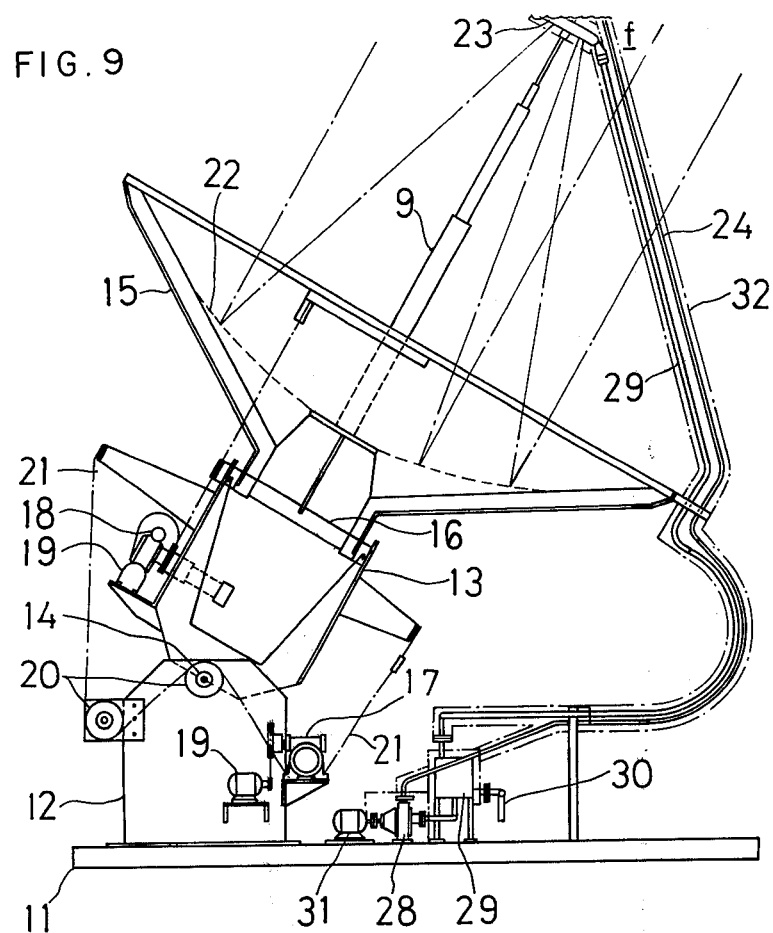
FIG. 9 is a schematic side elevation view of a solar heat boiler.
Figure 10:
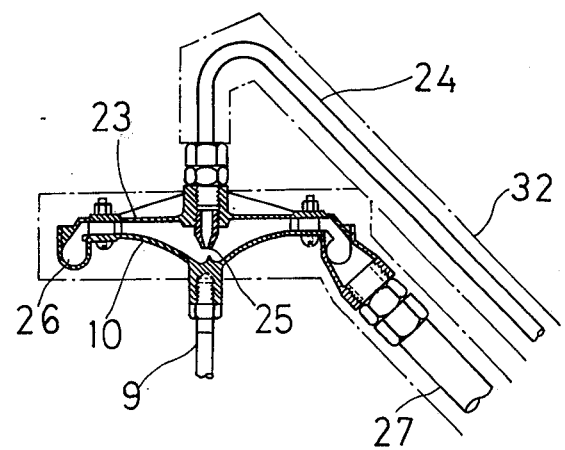
FIG. 10 is a vertical section of a boiler unit thereof.

According to one embodiment of the invention, the apparatus has, as seen in FIGS. 9 and 10, a base frame 11 with a bearing mount 12 provided on the base frame. The lower part of a turning body 13 is freely rotatably supported on a supporting shaft 14 on bearing mount 12.

A reflector mounting frame 15 is freely rotatably mounted on a supporting shaft 16 on the upper part of the turning body 13, and the supporting shaft 16 is at right angles to said turning body supporting shaft 14, thus permitting the reflector mounting frame 15 to turn perpendicularly to the turning body 13.

A turning mechanism 17 mounted on the bearing mount 12 is coupled to the turning body 13, and a turning mechanism 18 mounted on turning body 13 is coupled to the reflector mounting frame 15, and both turning mechanisms are driven by chains 21 which are fixed at both ends thereof to symmetrical points on the turning body 13 and reflector mounting frame 15, and guided over several chain sprockets 20 to the respective turning mechanisms driven by separate motors 19. Thus independent turning motions of the turning body 13 and reflector mounting frame 15 are possible.

The reflector body 22, as described above, comprises a large number of curved mirrors 1 arranged on the reflector mounting frame 15 in a concave spherical configuration, the curved mirrors 1 being so arranged that their optical axial planes are all oriented to the optical axis of the reflector body 22, whereby incident solar rays parallel to the optical axis of the reflector body 22 reflect from each curved mirror 1 and are focussed in a linear image $f$ and concentrate on the same conical surface.

A boiler unit 23 has a heating wall 10 at the position $f$ which faces toward the reflector body 22. The boilder body 23 is in the shape of a thin disk and is designed in such a way that an injection nozzle 25 connected to a feed water pipe 24 is provided at the center of a heating space within the body and causes ejected water to spread radially outwardly in the heating space in a screen flowing over the heating surface 10, and heated water collector path 26 is provided for around the periphery of the heating space, and is connected to a return pipe 27.

The other end of said feed water pipe 24 is connected through a circulating pump 28 driven by a motor 31 to a water supply (not shown), and the other end of the return pipe 27 is connected through a service tank 29 to the circulating pump 28 and a steam pipe 39.

A supporting post 9 holds the boiler body 23 in place, and insulating material 32 covers the feed water pipe 24 and the return pipe 27.

In operation, the optical axis of the reflector 15 is directed toward the sun by the action of the turning mechanisms 17 and 18 on turning body 13 and reflector body 22, and the solar rays reflect from each curved mirror 1 forming the reflector body 22 onto the heating wall 10 of the boiler body 23.

Feed water from the feed water pipe 24 is ejected from the injection nozzle 25 of the boiler body 23 against the inside surface of the heating wall 10, and the water forms a water screen on said surface while spreading out radially, being heated as it flows across said inside surface into the heated water collector path 26.

The heated water is further circulated through the return pipe 27, service tank 29, and circulating pump 28 to the boiler body 23 in order to heat it up to a specified temperature, so that it can be utilized as steam or heated water.

Analyzing the heat transfer at the boiler heating wall using an experimental equation for heat transfer to a laminar flow across a flat plate which closely resembles the fluid motion in the water screen in the present invention, the average heat transfer rate ($\alpha^{cm}$) (Kcal/$m^2$.h.°C) can be calculated by the following experimental equation:

$$\frac{\alpha^{cm} \cdot 1}{\lambda} = 0.664 \left( \frac{\mu_0 \cdot 1}{\nu} \right)^{0.5} \left( \frac{\nu}{a} \right)^{1/3}$$

where

1 = length of flat plate in $m$;
$\lambda$ = coefficient of thermal conductivity of fluid in Kcal/$m.h.$°C;
$\nu$ = coefficient of kinematic viscosity in $m^2$/S;
$a$ = coefficient of thermal diffusivity of fluid in $m^2$/S; and
$u_o$ = flow speed in m/S.

Supposing that 1, $\lambda$, $\nu$, and $a$ for boiler water which flows over a heating surface of some fixed dimensions are constant, the heat transfer rate $\alpha^{cm}$ becomes proportional to the flow speed $u_o$.

The above equation is quoted from *A Handbook of Mechanical Engineering*, published Apr. 15, 1968 by Nihon Kikai Gakkai, Tokyo, chapter 11, "Heat and Thermal Dynamics," section 1, 9–3–b "Laminar Flow Heat Transfer in Flat Plate," equation (49).

Figure 12:
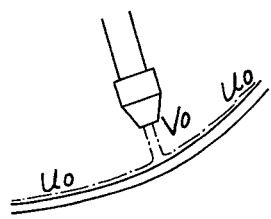
FIG. 12 is an enlarged elevation view of a nozzle jetting water and forming a water screen.

Further, a shown in FIG. 12, the flow speed of the fluid in the water screen, which is formed when water ejected from the nozzle 25 collides with the flat plate, is the same as the speed of a water column ejected from a nozzle ($u_o = v_o$) neglecting a friction effect between them.

A water screen boiler utilizing this arrangement provides the highest fluid speed applicant is aware of among the circulating systems in which boiler water flows over a boiler heating surface.

As can be seen from the above two reasons, the water screen boiler has an extremely good performance and a thermal efficiency as high as 97% can actually be obtained at present in the laboratory.

In a solar boiler, solar rays reflected from a reflector should necessarily be concentrated on a surface of a body of rotation such as a conical or a spherical surface, which is as small as possible. This is due to two reasons. One is to decrease to a minimum the loss caused by heat radiation, and the other is to provide a heat exchanging section which is as light-weight and compact as possible. Moreover, since this solar energy absorbing surface is subjected to exposure to a high temperature and further to heat radiation, it must be composed of a boiler heating surface having an extremely high sensitivity and heat exchange performance. For this reason, the water screen formed by a jet nozzle is the most suitable mechanism for use with the above-described heating surface.

The water screen type heating wall illustrated in FIG. 10 has a small capacity, uses only one nozzle, and requires a sufficient quantity of circulating water and circulating water pressure so as to form a continuous water screen, even when the boiler unit swings approximately 120° with the spherical frame, so as to flow over the curved surface of the wall 10 of the solar boiler 23 of FIG. 10. Therefore, a relatively large amount of power is required to operate this embodiment.

Figure 13:
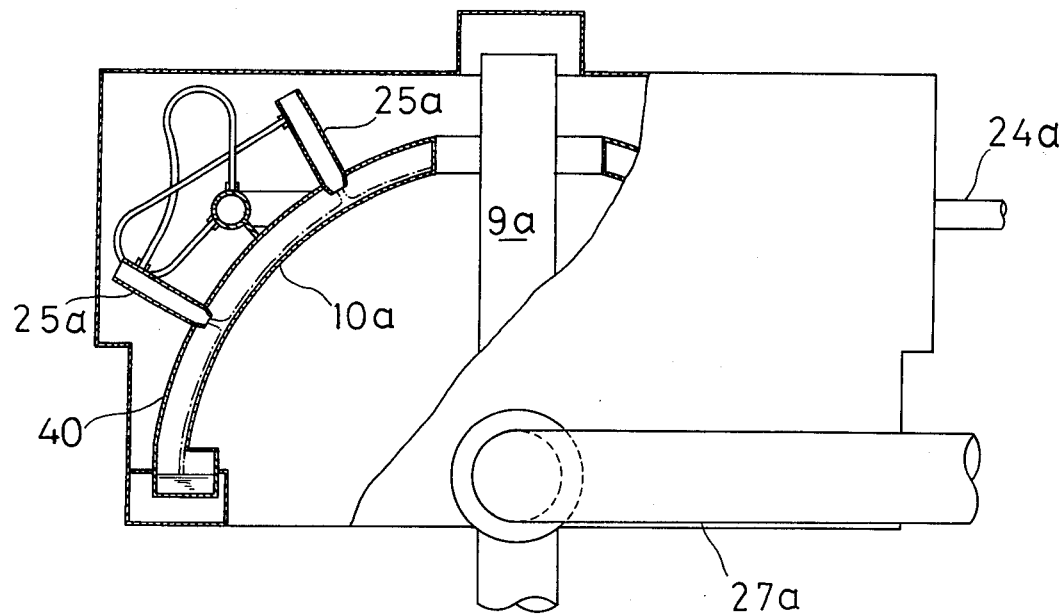
FIG. 13 is a vertical section view, partially broken away, of a modified boiler unit similar to that of FIG. 10.

The heating wall shown in FIG. 13 is a modification for a larger boiler system. Water is supplied through a pipe 24a to nozzles 25a mounted on a semi-spherical member 40 around a post 9a. Reflected solar rays are concentrated on a concave spherical surface side of wall 10a. Water ejected from nozzles 25a positioned at intervals over the surface 10a collides with the convex surface of wall 10a of the spherical heat exchanging section, thus producing the water screen. A relatively small amount of operating power is required, and a high heat transfer efficiency is obtainable with this mechanism.

In order to keep the optical axis of the reflector body 22 directed toward the sun, the turning mechanism 17 and turning mechanism 18 for the turning body 13 and reflector mounting frame 15 are periodically and intermittently operated. The operation is automatically performed by a control mechanism in accordance with a predetermined program based on the solar movement time table, such as is done with modern radio telescopes.

According to the invention as described above, the solar rays are reflected on a large number of curved mirrors forming the reflector body, linear images of each ray are radially focused on a small area, and the boiler body of the water screen boiler is positioned at this focal position with the heating wall opposed to the reflector body, so that an extremely high heat exchange efficiency is obtained. Further, the directing of the optical axis of the reflector body toward the sun in accordance with the solar movement is automatically performed by the intermittent actions of the turning body supported on the base frame and the reflector mounting frame supported on said turning body, which are mounted to turn perpendicularly to each other, so that the solar heat is always fully utilized to heat boiler water at the best efficiency. Thus this invention provides a useful technique for making good use of solar energy.

What is claimed is:

1. A solar heat boiler apparatus comprising a base frame, a turning body rotatably mounted on said base frame for turning movement about a horizontal axis, a reflector mounting frame rotatably mounted on said turning body for rotation around an axis perpendicular to said horizontal axis, turning mechanisms coupled to said turning body and said reflector mounting frame for turning said turning body and said reflector mounting frame to direct the reflector mounting frame toward the sun, a plurality of curved mirrors mounted side by side on said reflector frame in a concave spherical arrangement to form a reflector unit, each curved mirror having the shape of a small area on the surface of a large cylinder, the mirrors in the arrangement being positioned on circular lines concentric with the optical axis of the concave spherical arrangement and to reflect rays incident on the reflector unit parallel to the optical axis of the concave spherical arrangement to a focal position on said optical axis, and a boiler unit at said focal position to receive the reflected rays.

2. A solar heat boiler as claimed in claim 1 in which said mirrors are positioned in said arrangement so that the optical axial planes of said mirrors are oriented to the optical axis of the concave spherical arrangement, whereby the incident rays reflected from said mirrors are focused on a conical surface at said focal position.

3. A solar heat boiler as claimed in claim 1 in which said boiler unit comprises a heating wall at the focal position to receive the reflected rays from the reflector unit, nozzle means for forcing a stream of liquid to be heated against the surface of said heating wall on the opposite side thereof from the side toward the reflector unit so that said stream will form a film of liquid over said surface, and a liquid collector means around the periphery of the heating wall for collecting the liquid which is caused to flow over the wall from the nozzle means.

4. A solar heat boiler as claimed in claim 3 in which said heating wall is a generally inverted conical shape wall having the outer conical surface facing toward the reflector unit and the nozzle means is a nozzle directed toward the internal apex of said wall.

5. A solar heat boiler as claimed in claim 3 in which said heating wall is an inverted hemispherical wall with the concave surface facing said reflector unit, and said nozzle means is a plurality of nozzles directed at various points on the convex surface of said wall.

* * * * *